E. G. WESTON.
LAMP FOCUSING APPARATUS.
APPLICATION FILED MAY 20, 1916.
1,412,380. Patented Apr. 11, 1922.
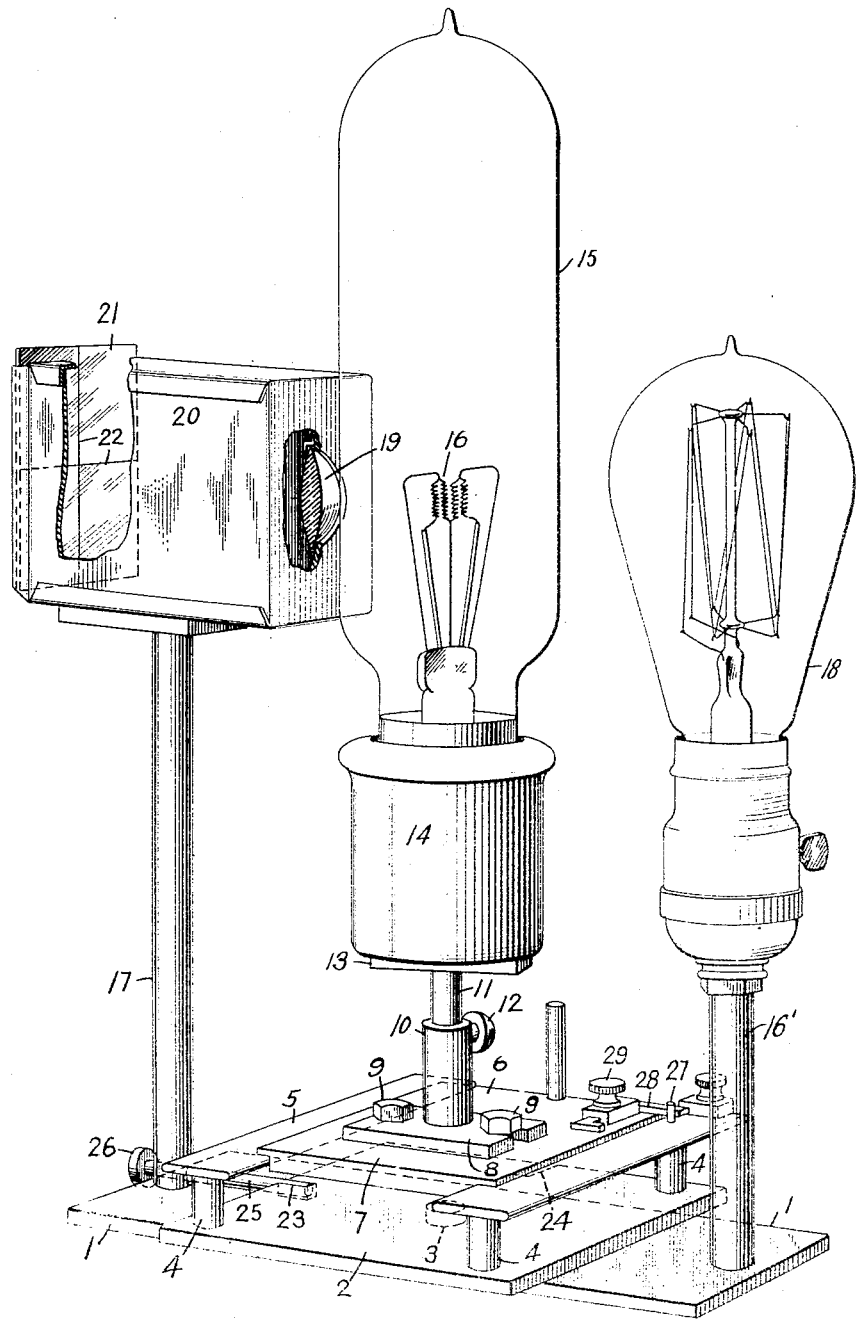
WITNESSES:
Fred H Miller
R D Brown
INVENTOR
Edward G. Weston
BY
ATTORNEY

UNITED STATES PATENT OFFICE.

EDWARD GORDON WESTON, OF FRYEBURG, MAINE, ASSIGNOR TO WESTINGHOUSE LAMP COMPANY, A CORPORATION OF PENNSYLVANIA.

LAMP-FOCUSING APPARATUS.

1,412,380.  Specification of Letters Patent.  Patented Apr. 11, 1922.

Application filed May 20, 1916. Serial No. 98,792.

*To all whom it may concern:*

Be it known that I, EDWARD G. WESTON, a citizen of the United States, and a resident of Fryeburg, in the county of Oxford and State of Maine, have invented a new and useful Improvement in Lamp-Focusing Apparatus, of which the following is a specification.

My invention relates to optical apparatus of the kind in which a stationary light source is maintained in definite focal relation to an optical system of lenses, mirrors or the like, and it has special relation to means for preliminarily focusing incandescent electric lamps and other light sources for use in picture-projection apparatus.

The object of my invention is to provide a device of the character indicated, by means of which the position of a lamp filament or other light source may be quickly and accurately adjusted with respect to its support.

In a copending application of Arthur R. Dennington, Serial No. 332,757, filed October 23, 1919, continuation of application Serial No. 98,824 filed May 20, 1916, a method of focusing projection lamps is set forth, such method consisting essentially in providing a projection device with interchangeable lamp holders and effecting a preliminary focusing adjustment of the lamp filament by means of an adjusting frame separate from the projection apparatus but adapted to receive the lamp holder in the same manner as the projection apparatus receives it. My present invention is specifically intended to improve the preliminary focusing device described in the said copending application.

In accordance with this invention, there is provided a preliminary focusing apparatus suitable for use with, but independent of, a lens system such as used in the exhibition of motion pictures and stereopticon slides, said apparatus being substantially a duplicate of parts of the mechanism associated with said lens system. The principal features embodied in the focusing apparatus consist of placing an object, whose image is to be projected upon a screen, intermediate the screen and a source of light, projecting the image of the object upon the screen by means of a lens, and then placing the image within a defined area or spot by means of an adjusting mechanism. Specifically, this apparatus may comprise what is, in fact, a master frame by which a source of light, such as an incandescent lamp, may be correctly adjusted before insertion into a projection apparatus. The master frame is adapted to receive a supporting base for a lamp, said base being provided with means which permits the adjustment of the lamp so as to bring its filament within, and movable along, an optical axis which is coincident with that of the projecting apparatus. This may be accomplished by locating a source of light on one side of the lamp to be adjusted, and a lens upon the other, and then placing a focusing screen so as to receive the image of the lamp cast thereon by the source of light. The lamp-supporting base is so constructed that it may be removed from the master frame after the lamp has been adjusted and easily and quickly fitted into the projection apparatus, said lamp being conditioned to be in proper focus with respect to said apparatus.

The single figure of the accompanying drawing is a perspective view of a focusing device constructed in accordance with my invention and comprising a stationary base plate 1 upon which a second plate 2 is centrally mounted for rotation upon a pin 3. The plate 2 carries, near its four corners, a set of pins 4 upon which is mounted a frame, consisting of two parallel plates 5, which is adapted to receive a lamp holder 6. The lamp holder 6 consists of a base plate 7 adapted to slidingly fit upon the frame 5 and carrying a plate 8 which is slotted to receive bolts 9 and which may be laterally moved upon the base plate 7 when the bolts 9 are loose. The plate 8 carries a vertical sleeve 10 within which is slidably disposed a pin 11, the position of which, with respect to the sleeve 10, is fixed by means of a set screw 12. The pin 11 carries a suitable support 13 for the base 14 of a lamp 15 which is provided with a filament 16 consisting, as shown, of four helical sections spaced apart in a single vertical plane.

To the opposite ends of the stationary base member 1 are secured vertical supports 16' and 17. The support 16' carries, upon its upper end, an incandescent electric lamp 18 of ordinary construction, and the support 17 carries an indicating device consisting of a lens 19 enclosed within a hood 20, the outer side of which is closed by a plate of ground glass 21 that is preferably provided with cross lines 22 or other suitable indicating markings. The rotatable plate 2 is provided, at two adjacent edges, with slots 23 and 24, either of which is adapted to co-operate with a spring-pressed pin 25 to hold the rotatable frame in a stationary position. The pin 25 is withdrawn from the positioning slot by means of a knob 26 when it is desired to rotate the frame. The frame 5 carries a fixed stop 27 which is adapted to co-operate with an adjustable stop 28 carried by the base plate 7 of the lamp holder 6, the position of the stop 28 being fixed by means of the thumb screw 29.

In the operation of my device, the lamp holder 6 carrying the lamp 15 is placed in the position shown, with the plane of the filament 16 parallel to the ground glass screen 21 and the focusing lamp 18 is illuminated, thus projecting the image of the filament 16 through the lens 19 and upon the screen. By means of the indicating markings 22, the position of this image may be accurately noted and by suitable manipulation of the base member 7 and the supporting rod 11, the filament may be accurately brought into its correct position of vertical and lateral adjustment. When this proper position is obtained, the stop 28 is moved into engagement with the fixed stop 27, and the set screw 29 is tightened. The pin 25 is then withdrawn from the slot 23 to release the rotatable plate 2, which is turned through an angle of 90° to bring the slot 24 into registry with the pin 25, when the focusing operation is completed by loosening the bolts 9 and moving the plate 8 until the edgewise image of the filament 16 registers with the vertical cross-line upon the screen 21. If the proportions of the device and the markings upon the screen 21 are properly selected with respect to the projection apparatus with which the lamp is to be used, the filament adjusted in the manner just described will be found to be in perfect focus when the lamp holder 6 is placed in the lantern housing, of the projection apparatus.

It will be observed that, with this form of focusing device, the position of the image of the filament is so projected upon the ground-glass screen that its position may be accurately noted by an observer, irrespective of the angle at which the screen is viewed. This arrangement greatly facilitates the making of accurate observations and positively indicates when the correct focus has been obtained. It is to be understood that the structural details which I have shown and described may be variously modified without exceeding the limits of my invention and that, therefore, my invention is to be limited only by the scope of the appended claims.

I claim as my invention:

1. A device for adjusting light sources comprising a master frame, means thereon for movably positioning the light source to be adjusted, said means and light source being readily removable as a unit, an indicating device comprising a screen of ground glass or the like, a lens associated therewith, and a lamp for projecting the image of the said light source through the said lens and upon the said screen.

2. A device for adjusting light sources comprising a master frame, means thereon for movably positioning the light source to be adjusted, said means and light source being readily removable as a unit, an indicating device comprising a housing enclosing a condensing lens and a screen of ground glass or the like provided with indicating markings, and a lamp adapted to project the image of the said light source through the said lens and upon the said screen.

3. A device for adjusting light sources comprising a rotatable master frame adapted to receive a support carrying the light source to be adjusted, said support and light source being readily removable as a unit, means for determining the position of the said support upon the said frame, an indicating surface relatively stationary with respect to the said frame, and means for projecting the image of the said light source upon the said surface.

4. A device for adjusting light sources comprising a base member, a lamp and an optical indicating device secured to the said base member, and a master frame rotatably mounted upon the said base member between the said lamp and the said indicating device and adapted to receive a removable support carrying the light source to be adjusted, said support and light source being readily removable as a unit.

5. A device for adjusting light sources comprising a base member, a lamp and an optical indicating device secured to the said base member, a master frame rotatably mounted upon the said base member between the said lamp and the said indicating device and adapted to receive a support carrying the light source to be adjusted, said support and light source being readily removable as a unit, and means for releasably positioning the said frame upon the said base member.

6. In an optical device, the combination with an object to be projected, a source of light located at one side thereof and a projecting lens arranged at the other side, of a focusing screen, and means for locating the image of said object within a defined area or position upon said screen, said means including a carrier provided with a support or adjusting said carrier in two directions, and means for adjusting said support in a third direction.

7. In an optical device, the combination with an object to be projected, a source of light located at one side thereof and a projecting lens arranged at the other side, of a focusing screen, and means for locating the image of said object within a defined area or position upon said screen, said means including a rotatable frame adapted to receive a carrier for said object, said carrier and object being readily removable as a unit, and means for determining the position of said carrier upon said frame.

8. In an optical device, the combination with an object to be projected, a source of light located at one side thereof and a projecting lens arranged at the other side, of a focusing screen, and means for locating the image of said object within a defined area or position upon said screen, said means including a base member, a frame rotatably mounted upon said base member and adapted to receive a carrier provided with a support for said object, said carrier and object being readily removable as a unit, means for adjusting said carrier in two directions, and means for adjusting said support in a third direction.

9. An apparatus comprising a receptacle for a lamp, a lens system, an auxiliary source of light in alignment with the filament of the lamp, and in the optical axis of the system and a screen in a position to receive an image of the filament of the lamp, said receptacle being adjustable vertically, horizontally and transversely with respect to the optical axis.

10. A device comprising a master frame, means thereon for movably positioning the light source, said means and light source being readily removable as a unit, an indicating device comprising a screen of ground glass or the like, a lens associated therewith, and a lamp for projecting the image of the said light source through the said lens and upon the said screen.

11. A device comprising a master frame, means thereon for movably positioning the light source, said means and light source being readily removable as a unit, an indicating device comprising a housing enclosing a condensing lens and a screen of ground glass or the like provided with indicating markings, and a lamp adapted to project the image of the said light source through the said lens and upon the said screen.

In testimony whereof, I have hereunto subscribed my name this 28th day of April, 1916.

EDWARD GORDON WESTON.